March 24, 1931.    S. C. FOURNET    1,797,645
TIRE CARRIER
Filed Oct. 1, 1928    2 Sheets-Sheet 2
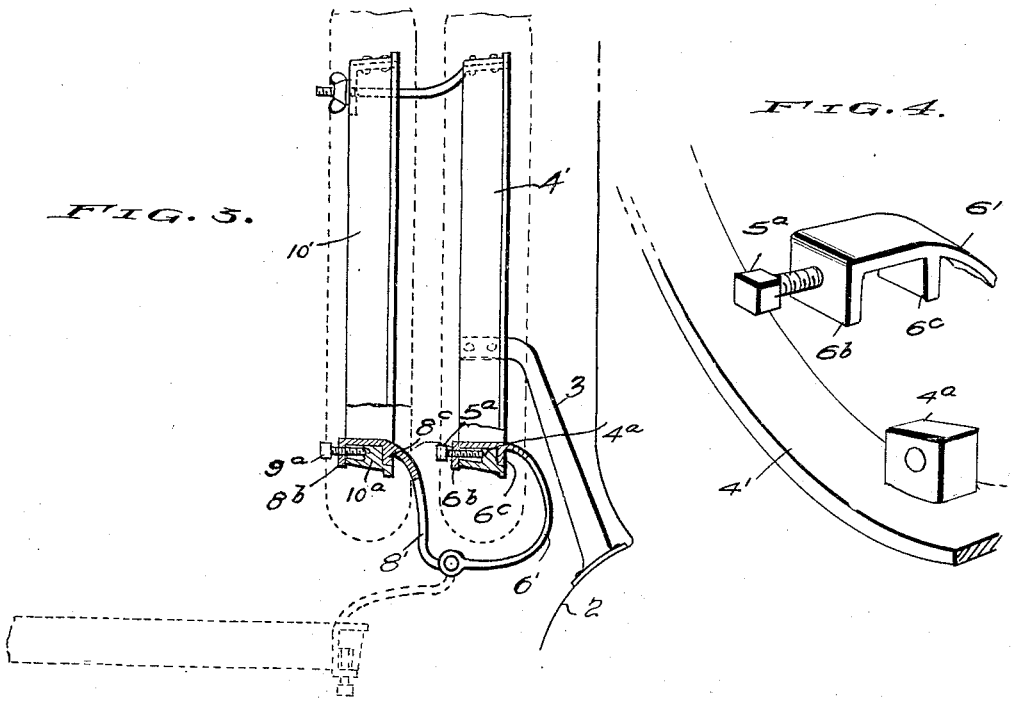
Inventor
SIDNEY C. FOURNET
By Eugene Stevens
Attorney Patented Mar. 24, 1931

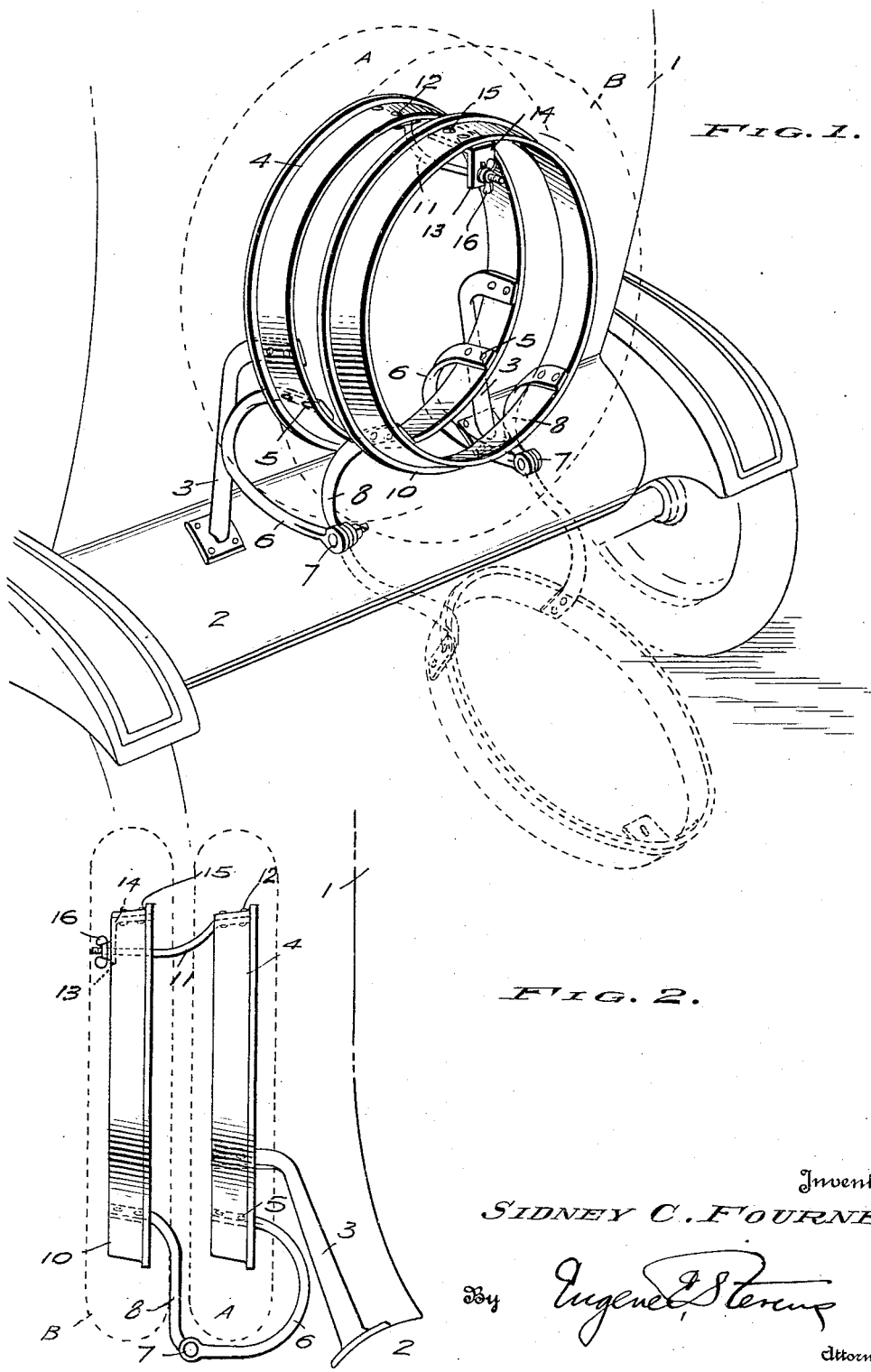

1,797,645

UNITED STATES PATENT OFFICE

SIDNEY C. FOURNET, OF NEW ORLEANS, LOUISIANA

TIRE CARRIER

Application filed October 1, 1928. Serial No. 309,377.

My invention relates to spare tire carriers for automobiles, and it has for its primary object to provide a novel and improved device of this kind whereby two or more spare tires can be carried and independently removed without the necessity of disturbing or dismounting an adjacent tire upon the carrier.

A further object of the invention resides in the provision of novel means whereby a conventional single tire carrier can be modified, without loss of time or the exercise of unusual skill, so that it will be capable of carrying two tires.

A still further object of the invention resides in the provision of a duplex tire carrier comprising independent and relatively swingable sections, each of which is adapted to carry a tire or rim.

The invention also resides in certain novel features of construction, combination and arrangement of the various parts, and in modes of operation to be hereinafter described and claimed, reference being had to the accompanying drawings which illustrate what now appear to be preferred forms of the invention.

It is to be understood, however, that the invention can be expressed in other modes than disclosed herein without departing from the spirit and scope of the subject matter claimed hereinafter.

In the drawings, wherein the same reference characters have been used to designate the same parts in all views, Figure 1 is a perspective view illustrating the application of the invention to the rear of an automobile and showing in dotted lines the outer tire carrying sections in lowered position;

Figure 2 is a side elevational view;

Figure 3 is a view partly in side elevation and partly in section illustrating a slight modification of the invention;

Figure 4 is a group perspective view showing fragments of certain elements included in the construction shown in Figure 3.

Referring specifically to the drawings, and particularly to Figures 1 and 2,—numeral 1 denotes a portion of the body of an automobile having a gas tank 2 and to which the supporting standards 3 of my tire carrier are secured. These standards are conventional in form and support a tire-carrying rim 4. So far the tire carrier will be seen to be of standard construction.

Secured as at 5 to the inner surface of the tire carrier 4 adjacent the bottom and at spaced points are a pair of arms 6 which are rearwardly curved, as shown, and have pivoted 7, at their ends the arms 8 which support an auxiliary tire carrying rim 10, which may be of any preferred or desired form.

Secured to the upper inner surface of the tire carrier 4, as indicated at 12, is a downwardly offset and forwardly extending arm 11, which is adapted to project through the depending slotted lug portion 13 of an angle plate 14 which is bolted or riveted to the inner surface of the tire carrier 10, as indicated at 15. The end of the member 11 receives a thumb nut 16 whereby the auxiliary tire carrier 10 is clamped or held in upstanding position.

The curve of the member 6 is sufficient to substantially encompass the tire A upon the carrier member 4 so that the pivot point 7 will be adjacent the outer surface of said tire A. Likewise the arms 8 are so curved that they will be disposed between the tire A upon the carrier 4 and the tire B upon the carrier 10. In this manner the arms 8 will be substantially concealed when a tire is assembled on the carrier 10.

As will be appreciated,—it is a simple matter to unscrew the thumb nut 16 and swing the carrier 10 downwardly on its pivot 7 so that the tire A on the carrier 4 can be removed. The means for securing the tires A, B on the carriers 4, 10 may be of any preferred or standard construction.

A slight modification of the invention of Figure 1 is shown in Figure 3 wherein the arm 6', which corresponds to the arm 6 in Figure 1, is secured to the tire support or carrier 4' by means of a clamp screw 5$^a$ extending through a downturned end lug 6$^b$ of arm 6' to engage the lug 4$^a$ of rim or carrier 4', said arm 6' having a depending shoulder 6$^c$ against which the rim lug is forced by the set screw. Since the weight of the arms 6' is upon the rim or carrier 4' the arms will be readily held in place by the clamp means described.

It will be readily understood from the foregoing description taken in connection with the accompanying drawings that the tires of the outer carrier sections can be readily removed, as usual, and further that the tires of the inner carrier sections can be readily removed by simply swinging the other carrier sections aside on their pivots. While I have shown the carrier sections horizontally hinged, yet it will be manifest that the hinge point may be vertical instead.

The invention contemplates not only the novel duplex carrier as a unit for attachment to automobiles, but also a modification of the conventional single tire carrier, as explained herein, by the addition of the outer tire or rim carrying section. Also, of course, the outer carrier can be made to swing in any direction. The subject matter claimed hereinafter should be interpreted in accordance with the above explanation.

The device is very simple in construction, convenient and efficient in use, and as will be apparent relatively inexpensive of manufacture.

Having thus described my invention, what I claim as new and desire to secure by Letters Patent is:

1. As an attachment for tire racks having a rim supporting annulus, an auxiliary rim mounting annulus, a forwardly and outwardly extending arm secured to the inner peripheral surface portion of said auxiliary annulus, a second arm pivotally connected to the end of said first mentioned arm at a point forwardly of the plane of the periphery of a tire on said first annulus, said second arm being curved forwardly, rearwardly and inwardly whereby its end will be disposed within said first mentioned annulus, clamp means at the end of said second mentioned arm and engageable with said first annulus to support said second annulus for relative pivotal movement with respect to said first annulus, and clamping means arranged within the first and second annuli to prevent relative movement thereof when removing a tire from the auxiliary annulus.

2. The combination set forth in claim 1,— and actuating means for said clamps operable from the rear for detaching the auxiliary annulus to form a single tire carrier.

3. The combination set forth in claim 1,— and said clamp means having a movable element cooperatively engaging with a lug depending from the top of the auxiliary annulus and accessible from the rear of said auxiliary annulus.

In testimony whereof I affix my signature.

SIDNEY C. FOURNET.